United States Patent Office 3,304,196
Patented Feb. 14, 1967

3,304,196
MAR-RESISTANT PRODUCTS AND PROCESS FOR PRODUCING SAME
William George Deichert, Flushing, N.Y., and Richard Lansing Webb, Darien, Conn., assignors to American Cyanamid Company, Stamford, Conn., a corporation of Maine
No Drawing. Filed Sept. 28, 1965, Ser. No. 491,003
13 Claims. (Cl. 117—76)

This application is a continuation-in-part of our copending application, Serial No. 307,812, filed September 10, 1963, now U.S. Patent No. 3,264,372.

This invention relates to a method for the production of a plastic body having a mar-resistant surface. More particularly, this invention relates to a method for the production of a plastic body having a mar-resistant surface which comprises coating said plastic body with a polycarbonate resin solution, evaporating off the solvent and coating the thus treated body with a substantially linear, water-insoluble, non-gelled unsaturated polyester resin composition. Still more particularly, this invention relates to a plastic body having a mar-resistant surface which is bonded to the plastic body by means of a binding agent comprising a polycarbonate resin.

One of the objects of the present invention is to produce a plastic body having a mar-resistant surface securely bonded to a plastic substrate or base member.

A further object of the present invention is to secure a mar-resistant surface to a plastic substrate or base by coating the plastic base with a solution of a polycarbonate resin, evaporating off the solvent and coating the base with a polyester resin composition, wherein the base before treatment is significantly less mar-resistant than after treatment.

A further object of the present invention is to provide a plastic body having a mar-resistant surface which is bonded to the plastic body by means of a binding agent comprising a polycarbonate resin.

These and other objects of the present invention will become more apparent to those skilled in the art upon reading the more detailed description set forth hereinbelow.

Many plastic bodies, particularly those prepared from thermoplastic materials, have a tendency to be receptive to abrasion and, as a consequence, have a low resistance to marring. Illustrative of these plastic bodies are objects made from poly(methyl methacrylate), polystyrene, polyvinyl chloride, polyvinyl acetate, polycarbonates and the like. In order to retain the otherwise outstanding physical and chemical characteristics of these objects, it is generally necessary to protect one or more of the surfaces thereof with a coating of a resinous material which is capable of being cross-linked to a thermoset condition and which displays, in said thermoset condition, a hard, durable, mar-resistant surface.

In the application of coating compositions such as those recited more specifically hereinbelow, it has been found that the bonding of the mar-resistant coating to the plastic base can be significantly enhanced by coating the surface of said plastic base, to which the mar-resistant finish is to be applied, with a solution of a polycarbonate resin.

We have found that by coating the surface of the polymer base with a solution of a polycarbonate resin for from about 5 seconds to 60 minutes, preferably 10 seconds to 30 minutes, and then evaporating off the solvent, we can prepare the polymer base for contact with the mar-resistant layer.

Utilizing this procedure, we have found that the mar-resistant coating is more securely bonded to the polymer base than if the polycarbonate treatment is omitted, or well known prior art techniques are used.

Any known polycarbonate resin may be used in the process of the instant invention. One useful type of polycarbonate is produced by reacting phosgene with a dihydric phenol such as Bisphenol A; alkyl, halo, carboxyl or hydroxy derivatives of Bisphenol A or Bisphenol A condensates under known reaction conditions, i.e. the Bisphenol A component is melted and the phosgene is injected into the melt under pressure. These Bisphenol A polycarbonates generally have the formula

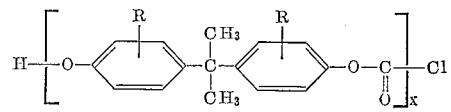

wherein R is H, an alkyl, halo, carboxyl or hydroxy radical and $x$ is the number of recurring units in the polymer. More specific details regarding polycarbonates can be found in Christopher et al., Polycarbonates, Reinhold Publishing Corp., N.Y., 1962, which publication is hereby incorporated herein by reference.

Solvents which may be utilized to form the polycarbonate solution used as the binder in the instant process include chloroform, monochlorobenzene, methylene chloride, dioxane, tetrahydrofuran and the like. Concentrations of polycarbonate ranging from 0.5% to 25%, by weight, are generally sufficient in that higher concentrations increase the difficulty of preparing optically clear coatings.

Any known unsaturated polyester resin may be used as the mar-resistant surface coating in our novel process, i.e. those produced by reacting an unsaturated polycarboxylic acid with a polyhydric alcohol under known conditions.

A preferred coating used as the mar-resistant surface on the plastic bodies in the practice of the process of the present invention, is broadly a substantially linear, water-insoluble, non-gelled unsaturated polyester resin composition comprising a blend of (1) the esterification reaction product of reactants consisting essentially of fumaric acid and either a polyethylene or polypropylene glycol wherein said glycol has between 6 and 39 carbon atoms, and said product has an acid number below about 35 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40%, by weight, based on the total weight of (1) and (2).

In order to eliminate any tendency for said coating to develop a haze, especially over a wide temperature range, the aforementioned linear polyester resin composition may be further modified by adding thereto comparatively small amounts, such as between about 1% and 5%, by weight, of a polymerizable styrene, wherein said percentages by weight are based on the total weight of the glycol fumarate, the glycol diacrylate and the styrene monomer.

Examples of polymerizable styrenes include styrene per se, side chain and ring-substituted halo and/or alkyl styrenes such as α-chlorostyrene, α-methylstyrene, o-, m-, and p-methyl styrenes, o-, m-, and p-chlorostyrenes, 2,4-dimethyl-styrene, 2,5-dimethylstyrene, 2,3-dichlorostyrene, 2,4-dibromostyrene and the like. The use of halogen-containing styrenes is to be avoided, however, when a clear, water-white composition is desired.

Insignificant amounts of other additives which have no serious detrimental effect on the properties of the ultimate product produced are also within the scope of the mar-resistant coatings which may be used in the process of the present invention.

More specifically, the surfacing material used to impart the mar-resistant characteristic to the plastic base in the process of the present invention is more completely set forth in our above-mentioned, copending parent patent application as well as application Serial No. 390,197, filed August 17, 1964, now U.S. Patent 3,265,763, in the names of Deichert and Christensen. In the aforesaid applications, there are set forth more concise disclosures of the substantially linear, water-insoluble, non-gelled, unsaturated polyester resin compositions which may be used as the surfacing components in the present invention. These polyester resin compositions impart, to the substrates to which they are applied, markedly improved mar-resistant properties in those instances when the substrate itself has a deficiency in mar-resistance. When the plastic substrate is coated with the polyester resin composition used in the present invention without pre-treatment with the polycarbonate resin, the bonding of the polyester resin film to the substrate is poorer and less secure, as measured by the Scotch tape grid test, than a comparable plastic base which has been coated with the polycarbonate according to the instant process.

In these preferred mar-resistant compositions, the first component is the esterification reaction product produced by reacting fumaric acid with a polyethylene or polypropylene glycol.

Among the polyethylene glycols which may be used to esterify the fumaric acid are triethylene glycol, tetraethylene glycol, pentaethylene glycol, hexaethylene glycol, heptaethylene glycol, octaethylene glycol, dodecaethylene glycol and tridecaethylene glycol.

Among the polypropylene glycols which may be used to esterify the fumaric acid are dipropylene glycol, tripropylene glycol, tetrapropylene glycol, pentapropylene glycol, hexapropylene glycol, heptapropylene glycol, octapropylene glycol, nonapropylene glycol, decapropylene glycol, undecapropylene glycol, dodecapropylene glycol, tridecapropylene glycol and the like.

The preferred polypropylene glycols, preferred in that they impart a higher degree of weatherability to the resulant compositions than the other polypropylene glycols, are the secondary isomers of the above specified polypropylene glycols. These secondary isomers possess at least one terminal hydroxyl group on a secondary carbon atom.

Examples of isomeric compounds we may use in the practice of our invention include the secondary isomer of dipropylene glycol and the (secondary, secondary) isomer of dipropylene glycol. Similarly, the secondary and (secondary, secondary) isomers of all of the above specified polypropylene glycols may be used herein.

These polyethylene and polypropylene glycols may be used either singly or in combination with themselves or one another. The fumaric acid and the polyethylene or polypropylene glycol may be used in substantially equimolar proportions, since each is, for the purposes of esterification, difunctional. For preferred processing results, a slight excess amounting to about 5 to 20% of the glycol should be used over and beyond that amount stoichiometrically calculated to esterify substantially all of the carboxyl groups in the fumaric acid.

The second component used in the above-mentioned surfacing compositions, namely the glycol diacrylates, is prepared by esterifying an alpha, beta, ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene and tripropylene glycol, bis(4-hydroxybutyl) ether and the like. Among the monoglycols which may be used to esterify the acrylic acids are ethylene glycol, propylene glycol, the propanediols-1,2 and 1,3, the butanediols-1,2; 1,3; and 1,4 and the like. These glycol diacrylates can be used with the glycol fumarates either singly or in combination with one another. However, whether used singly or in combination, the glycol diacrylate should be present in the total composition in an amount varying between about 10% and 40%, by weight, based on the total weight of said glycol fumarate and said glycol diacrylate.

Additional mar-resistant coatings which may be utilized in our novel process are those composed of (A) the esterification reaction product of triethylene glycol and fumaric acid, (B) ethyl acrylate, (C) allyl methacrylate and (D) triallyl cyanurate. This composition is the subject of copending application, Serial No. 454,714, filed May 10, 1965, and contains between 60% and 90%, by weight, based on the total composition, of polyester (A), and from about 40%, by weight, to about 10%, by weight, of the other different copolymerizable monomers (B), (C) and (D). Polyester (A) may also contain trace amounts, i.e. up to 5%, of other acids such as phthalic acid, adipic acid, succinic acid, etc. and/or other alcohols such as 2-ethyl-1,3-hexanediol, neopentyl glycol and the like.

A further example of a suitable mar-resistant coating useful herein is set forth in copending application, Serial No. 459,464, filed May 27, 1965. This coating composition is composed of (a) the esterification reaction product of triethylene glycol and fumaric acid, (b) allyl methacrylate and (c) certain glycol diacrylates, i.e. those disclosed more fully hereinabove. The same trace amounts of acids and alcohols as specified immediately above may also be tolerated in this composition.

In a further modification, a suitable mar-resistant coating which may be used herein is composed of (I) the esterification reaction product of fumaric acid, and preferably equimolar amounts of triethylene glycol and 2-ethyl-1,3-hexanediol, (II) a polymerizable styrene and (III) certain glycol diacrylates. Components (II) and (III) are more fully discussed hereinabove in regard to the other useful mar-resistant coatings.

Trace amounts of other acids and alcohols are not tolerable in this specific composition which is more fully set forth in copending application, Serial No. 398,053, filed September 21, 1964, now U.S. Patent 3,265,764, by Deichert, Christensen and Ramsey, which application and all those mentioned hereinabove are hereby incorporated herein by reference.

The substantially linear, water-insoluble, non-gelled unsaturated polyester resin compositions used in the present invention may be converted to hard, mar-resistant coatings after they are applied to the polycarbonate-treated substrate. This conversion from the ungelled or thermosetting state to the hard, thermoset state can be accomplished by the application of heat and/or pressure with or without catalysis. Still further, the thermosetting material can be converted to the thermoset state by use of catalysts or initiators without resorting to either heat or pressure. The catalytic materials or polymerization initiators which would be used to make such a conversion in state are well-known in the art and have been used extensively for this purpose. Illustrative catalysts are the peroxide catalysts such as, benzoyl peroxide, tertiary butyl hydroperoxide, among many others. The ketone peroxides may also be used i.e. the methyl ethyl ketone peroxides, the diethyl ketone peroxides and the like. The amounts of the catalytic material used will be conventional such as between about 0.01% and 10% and more, usually between about 0.1% and 3%, by weight, based on the total weight of the polymerizable mar-resistant coating composition.

The coated plastic articles produced according to the process of the present invention have a plurality of designed end uses such as transparent panels to be used as windowpanes, television implosion shields, optical lenses such as those used in eyeglasses, including sunglasses, binoculars, telescopes and the like. If desired, the mar-reistant polyester resin compositions may have incorporated therein, ultraviolet light absorbers of which a substantial plurality are well known in the art. A significant number of these ultraviolet absorbers are disclosed in the Day et al., U.S. Patent 2,777,828. The amounts used are now conventional and are set forth in the aforementioned reference. If desired, particularly for show-window purposes and sunglasses, photochromic materials may be incorporated into the mar-resistant polyester resins used in the present invention, thereby permitting changes from a colored glass to a clear glass and vice versa, due to the absence or presence of light, including sunlight. If a permanent coloration is desired in the mar-resistant polyester resins used in the present invention certain dyes and/or pigments may be dissolved therein in order to achieve a tinting.

The following examples are set forth for purposes of illustration only and are not to be construed as limitations on the present invention except as set forth in the appended claims. All parts and percentages are by weight unless otherwise indicated.

apart. A piece of No. 600 Scotch cellophane tape is firmly pressed into contact with the coated surface so as to cover the cross-hatched area. When the tape is pulled off quickly, no peeling of the coated surface will be observed if the bonding is excellent. Slight removal of the finish at the edges of the scratches is permissible without affecting the reading.

*Example 2*

Example 1 is repeated in substantially all details except that the polyester resin composition contains, additionally, about 3 parts of monomeric styrene. The mar-resistance of the ultimate coated article is 3, and none of the coating is removed by the Scotch tape grid test. The haze value of the finished product is 0.2%. When a sheet of poly(methyl methacrylate), coated with the same polyester resin, but not treated with the polycarbonate resin, is treated with the Scotch tape grid test, all the polyester coating is removed.

Following the procedure of Example 1, various other polyester compositions, base polymers, and polycarbonate resins were utilized according to the instant invention. The results are set forth in Table 1, hereinbelow.

TABLE 1

| Ex. | Polyester Composition, Parts | Base Polymer | Polycarbonate | Mar Resistance | Grid Test |
|---|---|---|---|---|---|
| 3 | Same as Example 1 | Same as Ex. 1 | (1) | 4 | Passed, no coating removed. |
| 4 | ___do___ | Polycarbonate [2] | (1) | 3 | Do. |
| 5 | Tripropylene glycol fumarate-80; diethylene-glycol diacrylate-20; styrene-10. | Poly(vinyl chloride) | (3) | 5 | Do. |
| 6 | Triethylene glycol fumarate-296; ethyl acrylate-60; allyl methacrylate-24; triallyl cyanurate-20. | Poly(methyl methacrylate) | (4) | 3 | Do. |
| 7 | Triethylene glycol/2-ethyl-1,3-hexanediol/ fumaric acid (1/1/2)-100; diethylene glycol diacrylate-25; styrene-5. | Poly(styrene) | (1) | 4 | Do. |
| 8 | Triethylene glycol/fumarate-80; triethylene glycol dimethacrylate-10; allyl methacrylate -10. | Poly(methyl methacrylate) | Same as Ex. 1 | 2 | Do. |

[1] Hydroquinone-phosgene reaction product.
[2] Phosgene-Bisphenol A reaction product.
[3] Dihydroquinone ether of ethylene glycol-phosgene reaction product.
[4] Resorcinol-phosgene reaction product.

*Example 1*

A cast sheet of poly(methyl methacrylate) is coated with a 1% chloroform solution of a polycarbonate resin (produced by reacting Bisphenol A with phosgene) at 23° C. for 1 hour. The solvent is then evaporated off at 75° C. Thereafter, a polyester composition comprising 80 parts of triethylene glycol fumarate [produced by reacting fumaric acid and triethylene glycol (50/55)] and 20 parts of polyethylene glycol dimethacrylate, catalyzed with a mixture of one part of a 60% solution of methyl ethyl ketone peroxide in dimethyl phthalate, one part of benzoyl peroxide, 0.0005 part of cobalt as cobalt naphthanate and 0.003 part of calcium as calcium naphthanate, is poured onto the polycarbonate-treated poly(methyl methacrylate) sheet. The resultant coated sheet is placed between two layers of plate glass and clamped together to form a unitary structure. The entire assembly is held at 70° C. for 16 hours and 100° C. for 90 minutes. On cooling, the glass plates are removed and the surface of the resultant sheet is tested for mar-resistance and bond strength. The mar-resistance is 3 and the bond is excellent as measured by the Scotch tape grid test. Haze is 0.7%. The mar-resistance of an uncoated sheet of poly(methyl methacrylate), using the same mar-tester, is 30. A rating of 1–5 is very good while a rating of over 16 is poor. All of the polyester mar-resistant coating is removed by the Scotch tape grid test when a coating is applied to a poly(methyl methacrylate) sheet which was not coated with a polycarbonate resin initially.

The Scotch tape grid test is accomplished by cutting the finished surface through with a sharp edge in a series of parallel lines about 1/16" apart and then with a similar series at right angles to the first series, also spaced 1/16"

We claim:
1. A process for improving the mar-resistance of a rigid plastic sheet and also improving the bonding of the surface layer to said sheet comprising contacting a rigid plastic sheet of a polymer selected from the group consisting of polyacrylates, polystyrenes, polyvinyl halides, polyvinyl acetates and polycarbonates with a solution of a polycarbonate resin, evaporating off the solvent, coating the thus treated sheet with a substantially linear, water-insoluble, non-gelled, unsaturated polyester resin composition consisting essentially of a blend of (1) the esterification reaction product of fumaric acid and a glycol selected from the group consisting of polyethylene glycol and polypropylene glycol wherein said glycol has between 6 and 39 carbon atoms, said reaction product having an acid number below about 35 and (2) from about 10% to about 40%, by weight, based on the total weight of (1) and (2), of at least one monomer copolymerizable therewith and curing said polyester resin.

2. A process according to claim 1 wherein said copolymerizable monomer is a glycol diacrylate which is the reaction product of a glycol selected from the group consisting of polyglycols having from 4 to 8 carbon atoms, inclusive, and monoglycols having from 2 to 4 carbon atoms, inclusive and an acid selected from the group consisting of acrylic acid and methacrylic acid.

3. A process according to claim 2 wherein said plastic sheet is poly(methyl methacrylate).

4. A process according to claim 1 wherein said plastic sheet is poly(methyl methacrylate).

5. A process according to claim 1 wherein said polycarbonate is the reaction product of Bisphenol A and phosgene.

6. A process for improving the mar-resistance of a rigid plastic sheet and also improving the bonding of the surface layer to said sheet comprising contacting a rigid plastic sheet of a polymer selected from the group consisting of polyacrylates, polystyrenes, polyvinyl halides, polyvinyl acetates and polycarbonates with a solution of a polycarbonate resin, evaporating off the solvent, coating the thus treated sheet with a substantially linear, water-insoluble, non-gelled, unsaturated polyester resin composition consisting essentially of a blend of (1) the esterification reaction product of fumaric acid and a glycol selected from the group consisting of polyethylene glycol and polypropylene glycol wherein said glycol has between 6 and 39 carbon atoms and wherein said product has an acid number below about 35, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2), and (3) a polymerizable styrene, in an amount varying between about 1% and 5%, by weight, based on the total weight of (1), (2) and (3) and curing said polyester resin.

7. A process according to claim 6 wherein said plastic sheet is poly(methyl methacrylate).

8. A process according to claim 6 wherein said polycarbonate is the reaction product of Bisphenol A and phosgene.

9. A rigid plastic body having a mar-resistant surface comprising a rigid plastic base sheet of a polymer selected from the group consisting of polyacrylates, polystyrenes, polyvinyl halides, polyvinyl acetates and polycarbonates having a coating on at least one surface thereof of a binding agent comprising a polycarbonate resin, and superimposed on said binding agent layer, a cured layer of a substantially linear, water-insoluble, non-gelled, unsaturated polyester resin composition consisting essentially of a blend of (1) the esterification reaction product of fumaric acid and a glycol selected from the group consisting of polyethylene glycol and polypropylene glycol wherein said glycol has between 6 and 39 carbon atoms, said reaction product having an acid number below about 35 and (2) from about 10% to about 40%, by weight, based on the total weight of (1) and (2), of at least one monomer copolymerizable therewith.

10. A rigid plastic body according to claim 9 wherein said copolymerizable monomer is a glycol diacrylate which is the reaction product of a glycol selected from the group consisting of polyglycols having from 4 to 8 carbon atoms, inclusive, and monoglycols having from 2 to 4 carbon atoms, inclusive and an acid selected from the group consisting of acrylic acid and methacrylic acid.

11. A rigid plastic body according to claim 9 wherein said base sheet is poly(methyl methacrylate).

12. A rigid plastic body having a mar-resistant surface comprising a rigid plastic base sheet of a polymer selected from the group consisting of polyacrylates, polystyrenes, polyvinyl halides, polyvinyl acetates and polycarbonates having a coating on at least one surface thereof of a binding agent comprising a polycarbonate resin, and superimposed on said binding agent layer, a cured layer of a substantially linear, water-insoluble, non-gelled, unsaturated polyester resin composition consisting essentially of a blend of (1) the esterification reaction product of fumaric acid and a glycol selected from the group consisting of polyethylene glycol and polypropylene glycol wherein said glycol has between 6 and 39 carbon atoms and wherein said product has an acid number below about 35, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2), and (3) a polymerizable styrene, in an amount varying between about 1% and 5%, by weight, based on the total weight of (1), (2) and (3).

13. A rigid plastic body according to claim 12 wherein said base sheet is poly(methyl methacrylate).

References Cited by the Examiner

UNITED STATES PATENTS

| | | | |
|---|---|---|---|
| 2,578,665 | 12/1951 | Bjorksten et al. | 117—138.8 X |
| 2,645,626 | 7/1953 | Norlander et al. | 260—872 X |
| 2,874,046 | 2/1959 | Klockgether et al. | 117—76 X |
| 2,884,404 | 4/1959 | Parker | 260—872 |
| 3,000,849 | 9/1961 | Clachan et al. | 117—34 X |
| 3,097,106 | 7/1963 | Blout et al. | 117—76 X |
| 3,117,018 | 1/1964 | Strauss | 117—161 X |

FOREIGN PATENTS 883,211   11/1961   Great Britain.

WILLIAM D. MARTIN, *Primary Examiner.*

R. HUSACK, *Assistant Examiner.*